(12) United States Patent
Kallioniemi et al.

(10) Patent No.: US 7,781,997 B2
(45) Date of Patent: Aug. 24, 2010

(54) METHOD AND APPARATUS FOR BRAKING A MOTOR

(75) Inventors: Antti Kallioniemi, Jokela (FI); Timo Syrman, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/397,857

(22) Filed: Mar. 4, 2009

(65) Prior Publication Data

US 2009/0167218 A1 Jul. 2, 2009

Related U.S. Application Data

(63) Continuation of application No. PCT/FI2007/000197, filed on Aug. 6, 2007.

(30) Foreign Application Priority Data

Sep. 11, 2006 (FI) .................................. 20060810

(51) Int. Cl.
*H02P 3/22* (2006.01)

(52) U.S. Cl. ...................... 318/379; 318/722; 318/724

(58) Field of Classification Search ......... 318/373–381, 318/400.31, 722, 724
See application file for complete search history.

(56) References Cited

U.S. PATENT DOCUMENTS

| 3,774,095 | A | * | 11/1973 | Coccia ........................ 318/371 |
| 4,093,900 | A | * | 6/1978 | Plunkett ..................... 318/370 |
| 4,296,362 | A |   | 10/1981 | Beasley |
| 5,170,105 | A | * | 12/1992 | Kumar ........................ 318/362 |
| 5,557,181 | A | * | 9/1996 | Naito et al. .................. 318/376 |
| 5,644,202 | A | * | 7/1997 | Toriyama et al. ............ 318/369 |
| 5,847,533 | A | * | 12/1998 | Hakala et al. ................ 318/798 |
| 5,877,601 | A | * | 3/1999 | Obara et al. .................. 318/139 |
| 5,933,573 | A |   | 8/1999 | Lukenich et al. |
| 6,384,556 | B1 |   | 5/2002 | Mizumoto et al. |
| 6,900,606 | B2 | * | 5/2005 | Youm .......................... 318/375 |
| 7,315,144 | B2 | * | 1/2008 | Imaie et al. .................. 318/380 |
| 7,368,889 | B2 | * | 5/2008 | Youm et al. .................. 318/801 |
| 2007/0205731 | A1 | * | 9/2007 | Beifus ......................... 318/362 |

FOREIGN PATENT DOCUMENTS

| EP | 0 501 036 A1 * | 9/1992 |
| EP | 0 920 119 A1 | 6/1999 |
| GB | 1 269 304 A | 4/1972 |
| JP | 9-47054 A | 2/1997 |
| JP | 2000-197204 A | 7/2000 |
| JP | 2001-157483 A | 6/2001 |

* cited by examiner

*Primary Examiner*—Bentsu Ro
(74) *Attorney, Agent, or Firm*—Birch, Stewart, Kolasch & Birch, LLP

(57) ABSTRACT

The invention relates to a method and an arrangement for braking a synchronous motor (4) used with a frequency converter (2). The braking current of the motor (4) is controlled by connecting only the negative changeover contacts (10) of the inverter (16) of the frequency converter (2) or alternatively by connecting only the positive changeover contacts (17) of the inverter (16) of the frequency converter. The arrangement comprises a control (3), which is arranged to control in a braking situation only the negative changeover contacts (10) of the frequency converter (2) or alternatively only the positive changeover contacts (17) of the frequency converter (2).

16 Claims, 3 Drawing Sheets

METHOD AND APPARATUS FOR BRAKING A MOTOR

Figure 1:
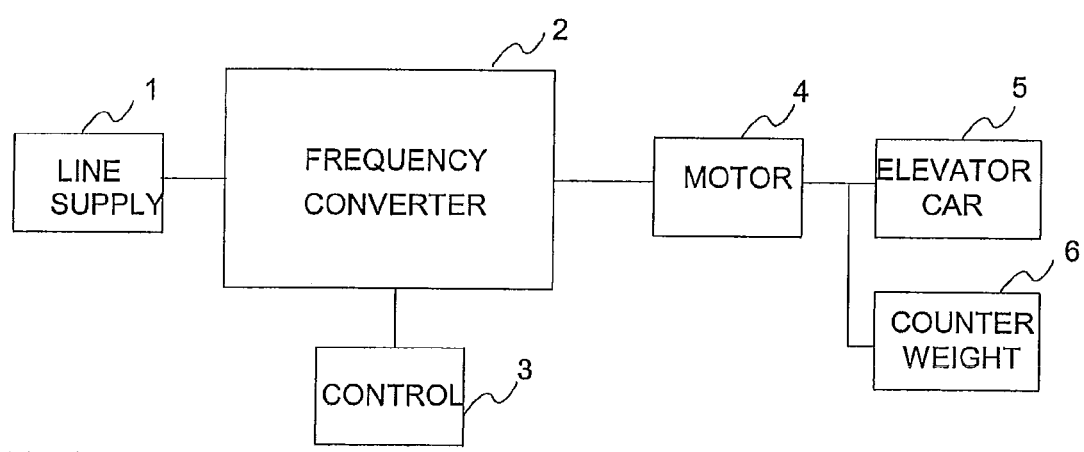

This application is a Continuation of copending PCT International Application No. PCT/FI2007/000197 filed on Aug. 6, 2007, which designated the United States, and on which priority is claimed under 35 U.S.C. §120. This application also claims priority under 35 U.S.C. §119(a) on Patent Application No. 20060810 filed in Finland on Sep. 11, 2006, the entire contents of each of the above documents is hereby incorporated by reference into the present application.

FIELD OF THE INVENTION

The present invention relates to a method as defined in the preamble of claim 1 and an arrangement as defined in the preamble of claim 13 for braking a motor.

PRIOR ART

The safe operation of an elevator system is ensured in the event of a malfunction, such as an electrical power cut, with a mechanical brake, which is often ensured also with electric braking of the motor, so-called dynamic braking. In dynamic braking the mechanical energy of the elevator is transferred through the motor to an external load. In this case at least acceleration of the elevator is prevented even if the mechanical brake does not operate.

When using an asynchronous machine, dynamic braking requires that direct current is supplied to the primary winding. This generally requires special arrangements and additional appliances such as separate rectifier devices for this purpose. With a DC machine it is possible to arrange braking by connecting a resistor to the armature circuit. A requirement in this case is that excitation of the machine operates.

With a synchronous motor, dynamic braking can be arranged in a similar manner as with a DC motor. The braking power and the current flowing via the braking resistor become great if the stator windings short-circuit the motor at full speed. Conversely, at slow speed there is sufficient torque to achieve a small descent speed.

If dynamic braking is arranged by connecting the stator windings in a short-circuit, a current component forms in the stator current, which is in the same phase as the magnetic field of the rotor, and which endeavors to weaken the magnetic field of the rotor. In this so-called field weakening situation the torque of the motor decreases. By connecting a resistor to the stator current circuit it is possible to operate in the kind of optimal state from the viewpoint of torque production in which only current that produces torque flows in the stator. In this case the stator current decreases during dynamic braking.

A contactor, for example, can be used as a switch in dynamic braking. Dynamic braking can also be implemented by connecting the intermediate circuit of the frequency converter in a short-circuit. This can be done e.g. by controlling the switches of the inverter closed. A problem in this field weakening state is the excess excitation current, which causes heat losses in the switches. If a semiconductor is used as a switch in dynamic braking, one problem is where to obtain the electrical control needed for the semiconductor switch e.g. in a situation in which the electricity supply of the elevator system disconnects and the mechanical brake of the motor is opened e.g. manually.

PURPOSE OF THE INVENTION

The purpose of the invention is to develop new and inexpensive dynamic braking for a synchronous motor moving the elevator car of an elevator system.

CHARACTERISTIC FEATURES OF THE INVENTION

The method according to the invention for braking a synchronous motor in an elevator system is characterized by what is disclosed in the characterization part of claim 1. The arrangement according to the invention for braking a synchronous motor in an elevator system is characterized by what is disclosed in the characterization part of claim 13. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

Although a rotating motor in particular is referred to in the characteristics of the invention described in the following, the principle of dynamic braking according to the invention also works for linear motors. In this case linear movement between the rotor and the stator is meant instead of rotary movement.

In the method according to the invention for braking a synchronous motor used with a frequency converter the braking current of the motor is controlled by opening and closing with short pulses only the negative changeover contacts of the inverter of the frequency converter, or alternatively only the positive changeover contacts of the inverter of the frequency converter. In this case the power supply from the intermediate circuit of the frequency converter towards the synchronous motor is at the same time prevented. When in the method the phases of the motor are connected briefly into a short-circuit by means of only the negative changeover contacts of the inverter, the braking current starts to grow controlled by the source voltage of the motor. When the negative changeover contacts are opened, the braking current tries to flow to the intermediate circuit via the antiparallel-connected diodes that are in parallel with the positive changeover contacts. In this case the capacitor in the intermediate circuit starts to charge and the intermediate circuit voltage starts to grow. When the negative changeover contacts are opened and closed with short pulses, the braking power is transmitted through the motor to the intermediate circuit of the frequency converter in a pulse-like manner. If, on the other hand, in the method the phases of the motor are connected briefly into a short-circuit by means of only the positive changeover contacts of the inverter, the braking current also starts to grow controlled by the source voltage of the motor. When the positive changeover contacts are opened, the braking current tries to flow to the intermediate circuit via the diodes that are in parallel with the positive changeover contacts, and from the intermediate circuit towards the motor via the diodes that are in parallel with the negative changeover contacts. When the positive changeover contacts are then opened and closed with short pulses, the braking power is transmitted through the motor to the intermediate circuit of the frequency converter in a pulse-like manner. In the method according to the invention it is sufficient that only the negative changeover contacts of those phases of the inverter in which the direction of the motor current is away from the motor are controlled, or alternatively only the positive changeover contacts of those phases of the inverter in which the direction of the motor current is towards the motor. This is because when the direction of flow of the current in the changeover switch is in the forward direction of the antiparallel-connected diodes that are in parallel with the positive or negative changeover contacts, the control of the changeover contact in question affects the flow of the current. There is also a method according to the invention, in which method only the negative changeover contacts of all the phases of the inverter are controlled simultaneously or alternatively only the positive changeover contacts of all the phases of the inverter are controlled simultaneously. This simplifies the control because the control logic does not need a separate inference about the direction of flow of the motor current. One advantage of the method according to the invention is that implementing dynamic braking does not need separate switches but it can be implemented purely by means of an inverter. This saves costs as well as space. In addition if the number of components decreases, the overall reliability of the system also improves.

By means of one method according to the invention the braking force is transmitted through the motor to the intermediate circuit of the frequency converter and onwards to the control system of some appliance controlling the frequency converter so that the aforementioned control system receives its operating electricity from the braking force of the motor. In one preferred embodiment of the invention operating electricities are supplied to the control of the elevator system by means of the braking power of the motor.

In one method according to the invention the current of the motor is measured and by changing the relative closed-time of the changeover contacts of the inverter the value of the current of the motor is minimized. When the stator current is measured and the measured current is controlled by means of the method according to the invention, the value of the stator current can be held constant by means of a current stabilizer. When the relative on-time of the changeover contacts is increased, the stator current tries to grow. Shortening of the relative on-time correspondingly reduces the stator current. The value of the current can be selected such that the motor operates from the viewpoint of torque production at all speeds of rotation of the motor at the kind of optimal point at which only current that produces torque flows in the stator and the value of the excitation component of the current is zero. In this case the stator current in the brake is the smallest possible, which reduces heat losses in both the inverter and in the stator windings of the motor.

In one embodiment of the invention the braking power of the motor is supplied to a display appliance that reports on movement of the motor and the display appliance is controlled by means of the braking power of the motor. When the elevator motor brakes, the braking power is transmitted to the intermediate circuit of the frequency converter and from the intermediate circuit the power is supplied onwards to the display appliance, in which case the display appliance detects movement of the elevator motor. The speed of rotation of the elevator motor can be estimated by measuring the magnitude of the source voltage of the motor. This happens in the way that the speed of the motor to be braked is estimated from the speed of change of the motor current during connection of the changeover contacts. The speed of change is directly comparable to the magnitude of the source voltage of the motor. In one method according to the invention the display appliance receives its operating voltage from the braking power of the motor, so that when a permanent-magnet motor is used as the motor to be braked the display appliance also operates in a situation in which the electricities of the elevator system are disconnected. An advantage of the method is that movement of the elevator motor can be monitored also when the elevator system is without electricity. A separate reserve supply system of electricity with accumulator backup is not needed for the power supply of the display appliance. In this preferred embodiment the display appliance is situated on a floor, but it can be situated also elsewhere in the elevator system, e.g. in the machine room. Conversely, the elevator system according to the invention can also be without machine room or without counterweight.

In one method according to the invention only the negative changeover contacts of the inverter are needed for control of the braking current of the motor, and in this case control of the positive changeover contacts can be prevented. According to the invention the switching on of the positive changeover contacts is prevented by disconnecting the signal path of the control signals of the positive changeover contacts with a safety relay. Disconnecting the control of the positive changeover contacts prevents power supply from the intermediate circuit of the frequency converter towards the elevator motor, in which case the elevator motor is not able to produce torque other than in conjunction with braking. In another method according to the invention only the positive changeover contacts of the inverter are needed for control of the braking current of the motor, and in this case the switching on of the negative changeover contacts can be prevented by disconnecting the signal path of the control signals of the negative changeover contacts with a safety relay.

Since in the method according to the invention the synchronous motor to be braked is a permanent-magnet motor and the operating voltage of the control of braking is made from the source voltage of said motor by rectifying, dynamic braking can be implemented totally without a separate electricity supply for the excitation winding. The permanently-magnetized synchronous motor starts to produce source voltage immediately when the rotor starts to rotate. The source voltage is rectified into direct-current voltage to the intermediate circuit of the frequency converter via the antiparallel-connected diodes that are in parallel with the changeover contacts of the inverter. In one preferred embodiment of the invention the control appliance of dynamic braking takes its control electricity directly from the intermediate circuit voltage, and the control of the braking is started automatically when a predefined value of the intermediate circuit voltage is reached. When the intermediate circuit voltage starts to grow as the rotor starts to rotate, the control appliance is connected on and starts to brake the motor. An advantage of this embodiment is that a separate energy store for the control appliance of dynamic braking is not needed, but instead dynamic braking works also e.g. in a situation in which the control electricities of the elevator system are disconnected and the brake of the elevator motor is opened manually. The whole control of the elevator system can also be arranged to take its power supply from the intermediate circuit of the frequency converter, in which case the control of the elevator system launches dynamic braking when it starts.

In one embodiment of the invention the braking power of the motor to be braked is controlled to a power resistor by connecting a power resistor to the intermediate circuit. The braking power supplied to the intermediate circuit of the elevator motor is converted into heat in a power resistor reserved for the purpose.

In the method according to the invention the operation of the control of braking is prevented by giving a prevention signal to the control. During normal use of the elevator system dynamic braking can be prevented by giving a prevention command from the control of the elevator system to the control appliance of dynamic braking, e.g. by controlling a switch, which isolates the control appliance of dynamic braking from the intermediate circuit voltage of the source voltage.

In the arrangement according to the invention for braking a synchronous motor used with a frequency converter, a control controlling only the negative changeover contacts in braking situations is arranged for opening and closing with short pulses these negative changeover contacts of the frequency converter or alternatively in the arrangement according to the invention for braking a synchronous motor used with a frequency converter, control controlling only these positive changeover contacts in braking situations is arranged for opening and closing with short pulses the positive changeover contacts of the frequency converter. In the arrangement according to the invention the power supply from the intermediate circuit of the frequency converter towards the synchronous motor is at the same time prevented.

In one arrangement according to the invention means are fitted to the intermediate circuit of the frequency converter for supplying the braking power of the motor to the control system of some appliance controlling the frequency converter.

In one arrangement according to the invention measurement means are fitted in connection with the control of braking for measuring the motor current as well as control appliances for minimizing the braking current of the motor.

One arrangement according to the invention comprises a display appliance for reporting on the movement of the motor. In this case the voltage source of the aforementioned display appliance receives its supply from the braking power of the motor.

One arrangement according to the invention comprises a safety relay, which is disposed in connection with the positive changeover contacts for disconnecting the signal path of their control signals. In this case, a control controlling only these negative changeover contacts in a braking situation is arranged for opening and closing with short pulses these negative changeover contacts of the frequency converter. Another arrangement according to the invention comprises a safety relay, which is disposed in connection with the negative changeover contacts for disconnecting the signal path of their control signals. In this case, a control controlling only these positive changeover contacts in a braking situation is arranged for opening and closing the positive changeover contacts of the frequency converter with short pulses.

One arrangement according to the invention comprises a power resistor as well as a switch for connecting the power resistor to the intermediate circuit of the frequency converter.

One arrangement according to the invention comprises means for preventing the operation of the control of braking.

The control of braking according to the invention can be implemented as integrated into the control system of the frequency converter, but it can also be a separate control appliance of braking, which is fitted in connection with the negative or positive changeover contacts In one arrangement according to the invention the motor to be braked is an elevator motor, but the arrangement according to the invention for braking a synchronous motor can also be applied to other systems than elevator systems. This kind of system can be a crane system, in which a synchronous motor is fitted to the hoisting machine. With the arrangement according to the invention it is possible to restrict movement of the hoisting machine e.g. when the network supply disconnects.

PRESENTATION OF DRAWINGS

FIG. 1 presents an elevator system according to the invention

Figure 2:
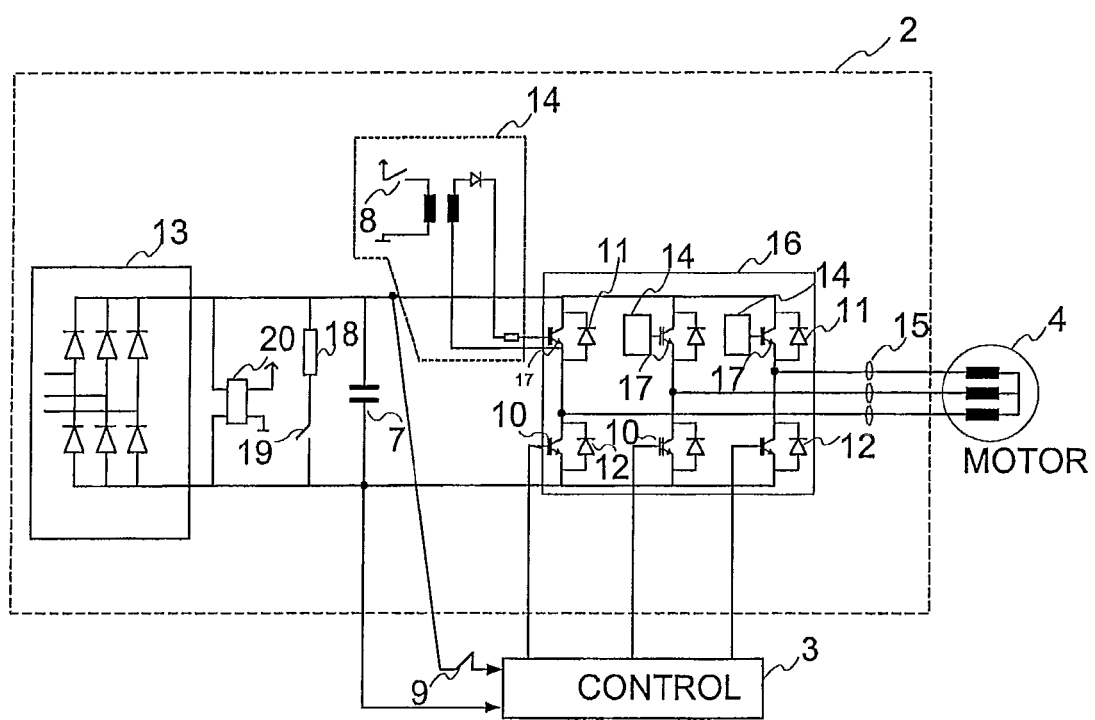
Figure 3:
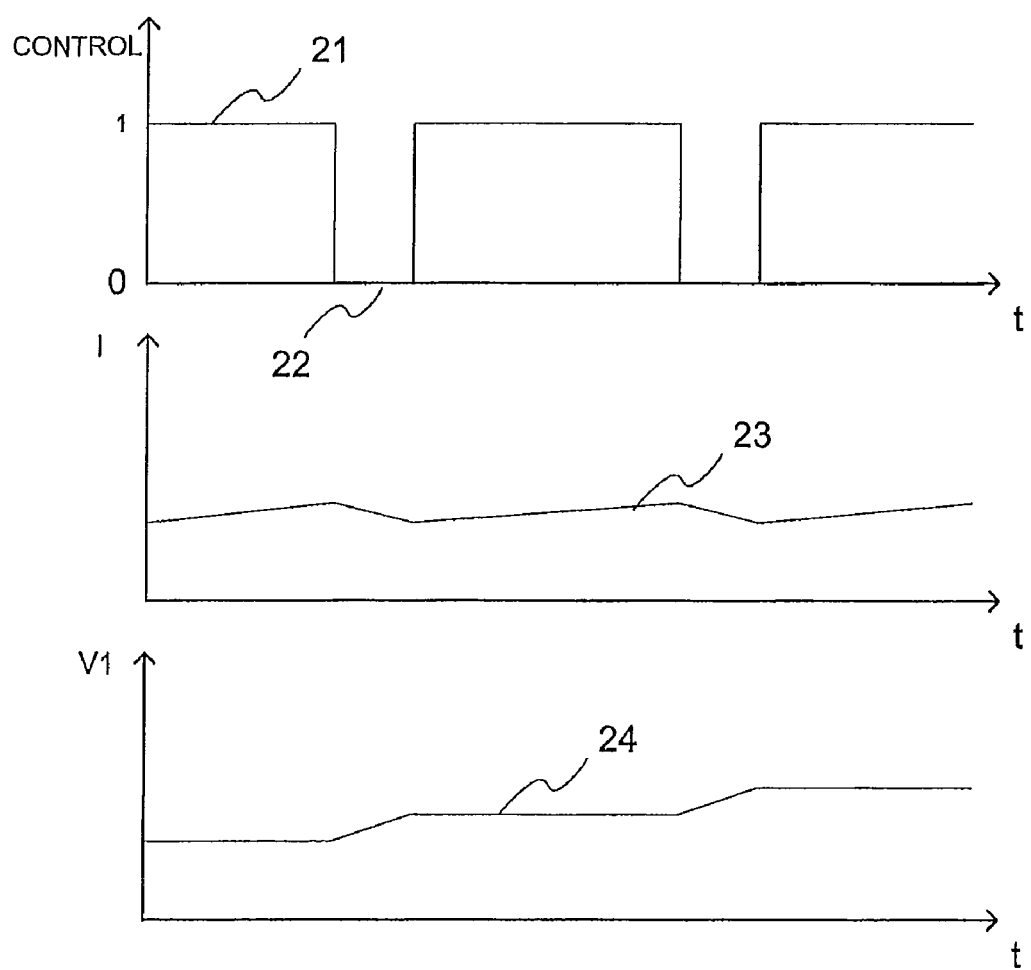

FIG. 2 presents an arrangement according to the invention for braking an elevator motor FIG. 3 presents graphs of the motor current and of the intermediate circuit voltage during dynamic braking

EMBODIMENTS

In the braking arrangements presented in the following embodiments the braking is implemented by controlling only the negative changeover contacts of the inverter of the frequency converter.

FIG. 1 presents an elevator system in which the elevator motor 4 used to move the elevator car 5 and the counterweight 6 is controlled with a frequency converter 2. A control appliance 3 of dynamic braking has been added to the elevator system. In normal use of the elevator system the energy needed to move the elevator car and the counterweight is obtained from the network supply 1. The elevator system can also be an elevator without counterweight.

FIG. 2 presents an arrangement according to the invention for braking an elevator motor. In this preferred arrangement the elevator motor 4 is a permanently magnetized synchronous motor. When the elevator motor 4 starts to rotate, the source voltage of the motor is rectified to the intermediate circuit of the frequency converter 2 via the antiparallel-connected diodes 11, 12. In this case the intermediate circuit voltage starts to grow. The control appliance 3 of braking receives its operating voltage from the intermediate circuit voltage. When the intermediate circuit voltage reaches a predefined level, which can be e.g. 5 volts, the control device 3 of braking switches on and starts to control the negative changeover contacts 10 of the inverter 16 with short pulse-like controls. When the negative changeover contact is closed, the braking current of the motor through the negative changeover contact starts to grow under the control of the source voltage of the motor. When the negative changeover contact opens, the braking current tries to pass to the capacitor 7 of the intermediate circuit via the antiparallel-connected diode 11 that is in parallel with the positive changeover contact 17. The intermediate circuit voltage starts in this case to grow.

The control appliance 3 of braking controls the negative changeover contacts 10 open and closed with short pulses, and at the same time the braking power of the elevator motor 4 is transmitted in a pulse-like manner to the intermediate circuit of the frequency converter 2. Since the control appliance 3 of braking receives its electricity supply from the source voltage of the motor, dynamic braking starts automatically when the elevator motor starts to rotate, and no backup system for electricity supply, such as an accumulator or a supercapacitor, is needed.

The surplus braking power of the motor is directed from the intermediate circuit to a power resistor 18 by closing the switch 19, and the braking power is consumed as heat in the power resistor.

Dynamic braking can be prevented by controlling the break switch 9 to open. When the switch 9 opens, the electricity supply from the plus pole of the intermediate circuit to the control appliance 3 of braking is disconnected, in which case dynamic braking is prevented. During normal functioning of the elevator system this contact 9 is controlled. In an exceptional situation, e.g. when the network supply 1 of the elevator system disconnects, control of the contact 9 is disconnected, the contact closes and dynamic braking of the elevator motor is permitted.

FIG. 3 illustrates the graphs of the motor current and of the intermediate circuit voltage during the switching cycle of the changeover contact 10. The changeover contact 10 is closed under the control of the pulse-like control pulse 21. In this case the motor current 23 starts to grow under the control of the source voltage of the motor. When the changeover contact 10 is opened with the control 22, the motor current 23 tries to pass to the intermediate circuit capacitor 7. In this case the motor current 23 starts to decrease, the intermediate circuit capacitor 7 starts to charge and the intermediate circuit voltage 24 starts to rise. The intermediate circuit capacitor 7 charges at the pace set by the control pulses 21, 22 of the negative changeover switch 10 and at the same time the braking energy of the motor is transmitted to the intermediate circuit. When the relative on-time of the control pulses 21 is increased, the stator current tries to grow.

In one embodiment of the invention the direction of the motor current 23 is measured and the negative changeover contacts 10 are controlled only in those phases of the inverter 16 in which the direction of the motor current is away from the motor 4.

In one embodiment of the invention the negative contacts 10 of all the phases of the inverter 16 are controlled simultaneously and with the same pulse-like control, in which case the structure of the control appliance 3 of braking can be simplified.

The invention is further described by the aid of a few examples of its embodiment. It is obvious to the person skilled in the art that the invention is not limited to the embodiments described above, but that many other applications are possible within the scope of the inventive concept defined by the claims presented below.

The invention claimed is:

1. A method for braking a synchronous motor used with a frequency converter while simultaneously preventing a power supply from an intermediate circuit of the frequency converter towards the synchronous motor, wherein in the method a braking current of the motor is controlled by controlling opening and closing with short pulses of only negative changeover contacts of an inverter of the frequency converter or alternatively only positive changeover contacts of the inverter of the frequency converter, wherein the braking power is transmitted through the motor to the intermediate circuit of the frequency converter and onwards to a control system of some appliance controlling the frequency converter and wherein the control system receives operating electricity from the braking power of the motor, wherein an operating voltage of a control of braking is made from a source voltage of said motor by rectifying, and wherein the control of the braking is started automatically when a predefined value of an intermediate circuit voltage is reached.

2. The method according to claim 1, wherein in the method only the negative changeover contacts of those phases of the inverter in which the direction of the motor current is away from the motor or alternatively only the positive changeover contacts of those phases in which the direction of the motor current is towards the motor are controlled.

3. The method according to claim 1, wherein in the method only the negative or alternatively only the positive changeover contacts of all phases of the inverter are controlled simultaneously.

4. The method according to claim 1, wherein the current of the motor is measured and by changing a relative closed-time of the changeover contacts of the inverter, the value of the current of the motor is minimized.

5. The method according to claim 1, wherein a speed of the motor to be braked is estimated from a speed of change of the motor current during connection of the changeover contacts.

6. The method according to claim 1, wherein switching on of the positive changeover contacts is prevented by disconnecting a signal path of control signals of the positive changeover contacts with a safety relay and wherein the braking current of the motor is controlled by opening and closing with the short pulses only the negative changeover contacts of the inverter of the frequency converter.

7. The method according to claim 1, wherein the synchronous motor to be braked is a permanent-magnet motor.

8. The method according to claim 1, wherein the braking power of the motor to be braked is controlled to a power resistor by connecting a power resistor to the intermediate circuit.

9. The method according to claim 1, wherein the operation of the control of braking is prevented by giving a prevention signal to the control.

10. The arrangement according to claim 1, wherein the synchronous motor to be braked is an elevator motor.

11. A method for braking a synchronous motor used with a frequency converter while simultaneously preventing a power supply from an intermediate circuit of the frequency converter towards the synchronous motor, wherein in the method a braking current of the motor is controlled by opening and closing with short pulses only negative changeover contacts of an inverter of the frequency converter or alternatively only positive changeover contacts of the inverter of the frequency converter, wherein the braking power of the motor is supplied to a display appliance that reports on movement of the motor and the display appliance is controlled by the braking power of the motor.

12. An arrangement for braking a synchronous motor used with a frequency converter while simultaneously preventing a power supply from an intermediate circuit of the frequency converter towards the synchronous motor, wherein for opening and closing with short pulses negative changeover contacts of the frequency converter a control controlling only the negative changeover contacts in braking situations is arranged or alternatively for opening and closing with the short pulses positive changeover contacts of the frequency converter a control controlling only the positive changeover contacts in braking situations is arranged, wherein, means are fitted to the intermediate circuit of the frequency converter for supplying a braking power of the motor to a control system of some appliance controlling the frequency converter, and wherein the arrangement comprises a safety relay which is disposed in connection with the positive changeover contacts for disconnecting a signal path of control signals and wherein for opening and closing the negative changeover contacts of the frequency converter with the short pulses the control controls only the negative changeover contacts in a braking situation is arranged.

13. The arrangement according to claim 12, wherein measurement means are fitted in connection with the control of braking for measuring a motor current as well as control appliances for minimizing the braking current of the motor.

14. The arrangement according to claim 12, wherein the arrangement comprises a power resistor as well as a switch for connecting the power resistor to the intermediate circuit of the frequency converter.

15. The arrangement according to claim 12, wherein the arrangement comprises means for preventing operation of the control of braking.

16. An arrangement for braking a synchronous motor used with a frequency converter while simultaneously preventing a power supply from an intermediate circuit of the frequency converter towards the synchronous motor, wherein for opening and closing with short pulses negative changeover contacts of the frequency converter a control controlling only the negative changeover contacts in braking situations is arranged or alternatively for opening and closing with the short pulses positive changeover contacts of the frequency converter a control controlling only the positive changeover contacts in braking situations is arranged, wherein the arrangement comprises a display appliance for reporting on movement of the motor and a voltage source of the display appliance receives a supply from the braking power of the motor.

* * * * *